United States Patent Office 3,060,680
Patented Oct. 30, 1962

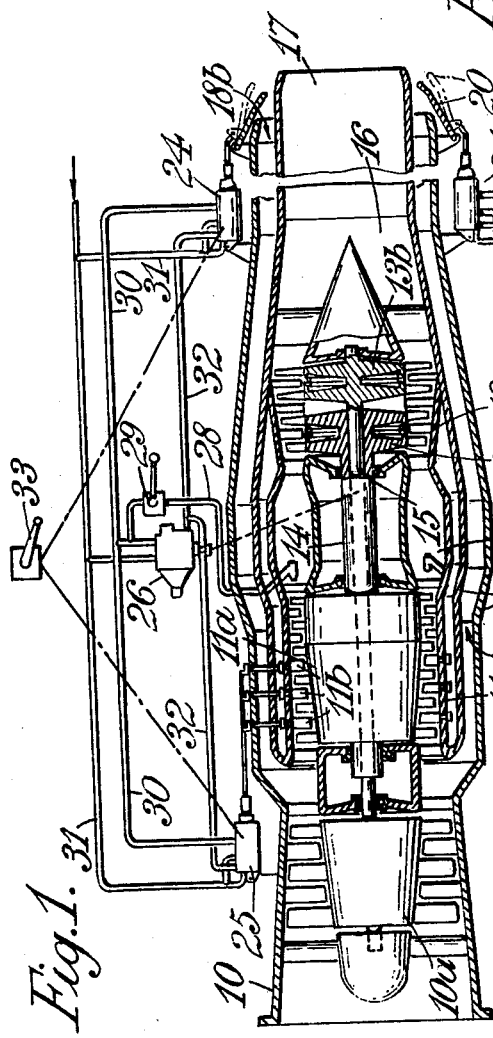

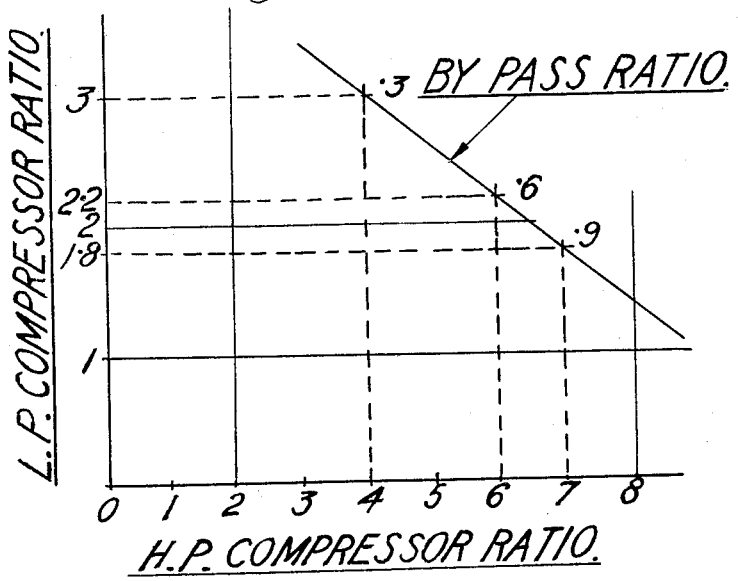

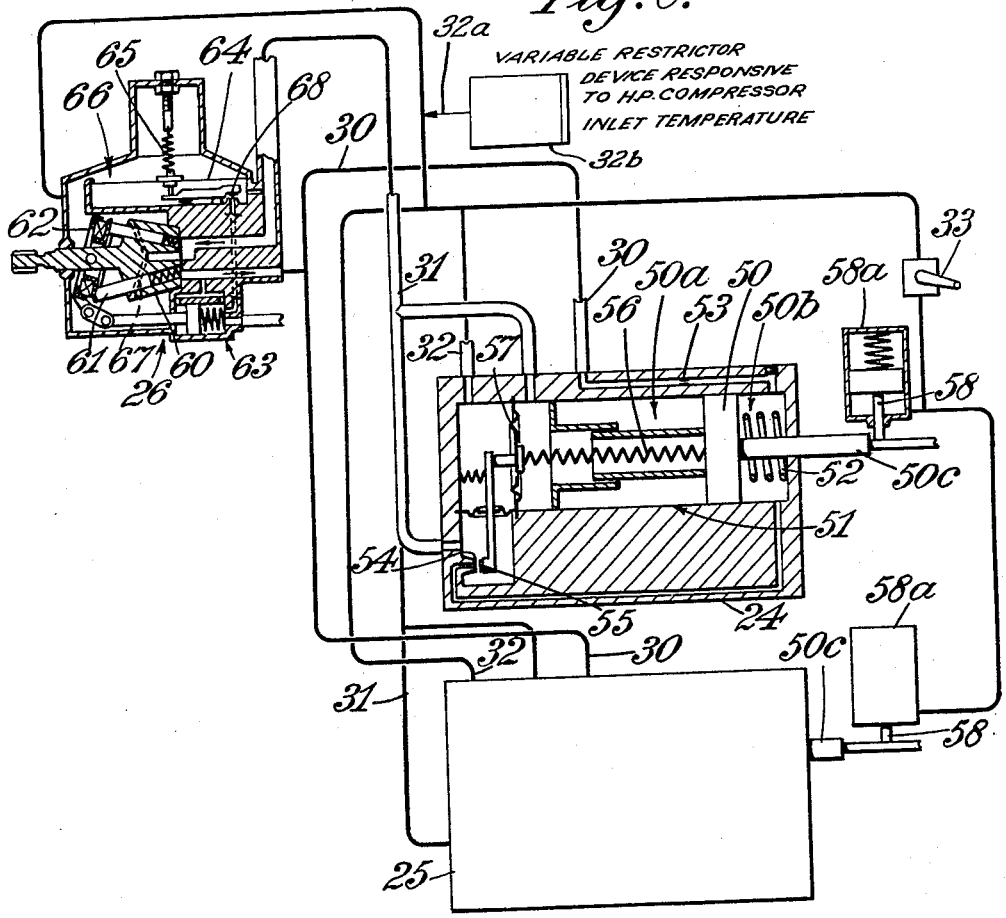
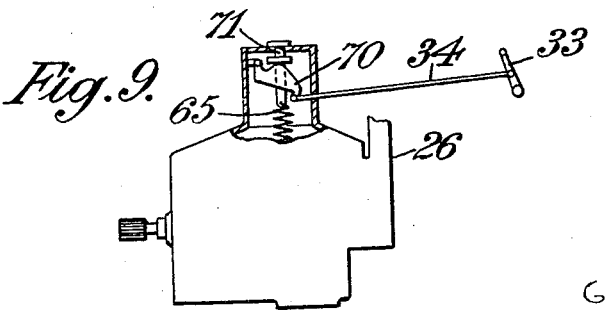

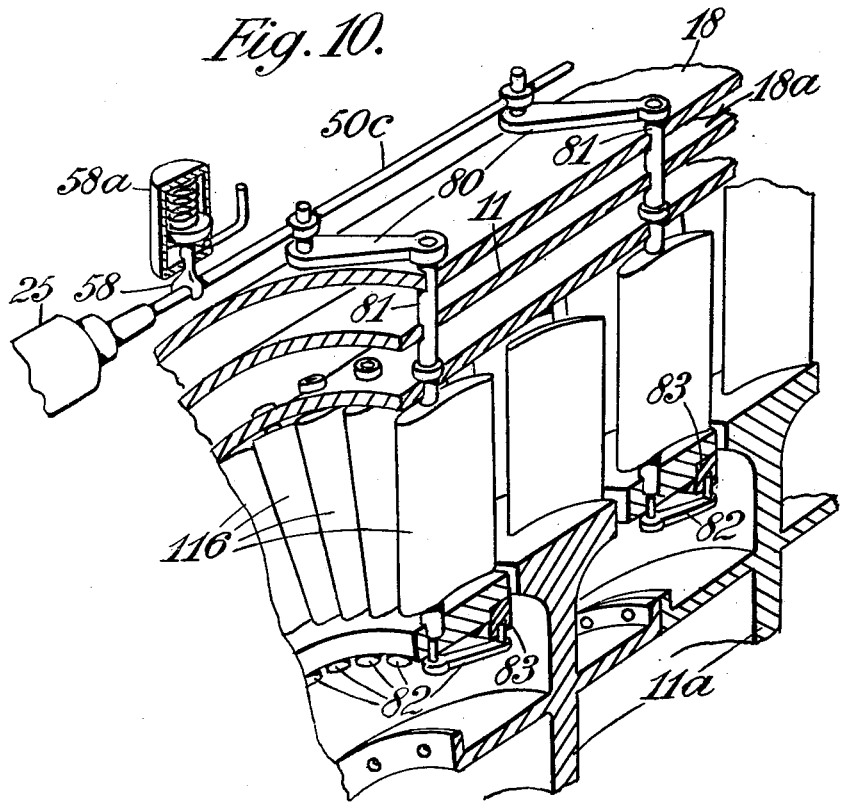

3,060,680
BY-PASS GAS-TURBINE ENGINE AND CONTROL THEREFOR
Geoffrey Light Wilde, Shottlegate, and Alan George Newton and Roland Michael Fitzgerald, Derby, England, assignors to Rolls-Royce Limited, Derby, England, a British company
Filed Dec. 29, 1958, Ser. No. 783,576
Claims priority, application Great Britain Dec. 30, 1957
14 Claims. (Cl. 60—35.6)

This invention comprises improvements in or relating to gas-turbine jet-propulsion engines of the by-pass kind, that is the form of gas-turbine jet propulsion engine which includes a low-pressure compressor, a high-pressure compressor having a rotor which rotates independently of the rotor of the low-pressure compressor, combustion equipment and turbines for driving the compressors arranged in flow series and in which there is a by-pass passage through which a proportion of the air compressed in the low-pressure compressor is led either directly to an exhaust nozzle opening to atmosphere, or directly into an exhaust system for the turbine means.

According to the present invention in one aspect, there is provided in an engine of the by-pass kind means whereby the proportion of air flowing into the by-pass passage may be progressively decreased and means whereby simultaneously the mass flow through the high-pressure compressor is increased. The provision of such means enables the thrust developed by the engine temporarily to be increased for short periods, for example for take-off purposes when the engine is an aircraft power unit.

The mass flow through the engine may be temporarily increased, for example, by adjusting a top-speed governor controlling the high-pressure compressor to allow the compressor to over-speed as compared with the design top-speed, but such a method is adopted only where over-stressing of the engine due to the increased rotational speed does not occur. Alternatively, stator blades of the high-pressure compressor may be made adjustable in stagger; in this case, when extra thrust is required, the stator blades are adjusted progressively in stagger to reduce their inclination with respect to the axial direction from the design inclination as the flow through the by-pass passage is progressively reduced. Hence the mass flow through the H.P. system is increased and this increases the thrust of the engine. During acceleration of the engine from starting speed and at fractions of top speed near to cruising speed it will sometimes be desirable to set the variable stagger blading at staggers greater than the design stagger thereby increasing the proportion of air flowing along the by-pass passage. In the following description, the design stagger will be treated as the zero position and the change in inclination for extra thrust on the one hand and acceleration and at part speed on the other hand will be termed negative and positive changes respectively.

The proportion of air flow through the by-pass passage may be controlled by providing adjustable flaps at an annular outlet from the passage, or, when the by-pass air is fed through nozzles into the turbine exhaust system, the proportion of air may be varied by providing adjustable valve elements in the nozzles.

According to the present invention in another aspect, a by-pass gas turbine engine has its high-pressure compressor provided with one or more rows of stator blades which are adjustable in stagger.

This arrangement enables a number of important effects to be obtained, for instance the adjustable stator blades may be controlled to effect matching of the pressures within the by-pass passage and exhaust assembly of the engine. Matching of these pressures may be effected by adjusting the stator blades in accordance with an engine operating parameter such as the corrected rotational speed of either the low-pressure compressor or the high-pressure compressor to adjust the blades negatively from a design setting as the corrected rotational speed increases. Preferably also in this case the low-pressure compressor is selected to have a low compression ratio and the high-pressure compressor is selected to have a high compression ratio.

Some embodiments of this invention will now be described with reference to the accompanying drawings, in which:

FIGURE 1 is a section through a by-pass gas turbine jet-propulsion engine and shows control means therefor, FIGURE 2 is an exemplary graphical representation of the variation of stator blade stagger with variation of the outlet area of the by-pass duct, FIGURE 2a shows the relationship between the stagger of the H.P. stator blading and the corrected H.P. speed;

FIGURE 2b is a diagram showing a stator blade in its design setting and indicating the positive and negative senses of its adjustment;

FIGURE 7 is a graph.

FIGURE 8 shows in more detail a construction of a ram and its control, this arrangement being suitable for use with the system illustrated in FIGURE 1.

FIGURE 9 illustrates a modification suitable for use in connection with the arrangement of FIGURE 3, and FIGURE 10 shows a construction or detail of the high pressure compressor.

Figure 3:
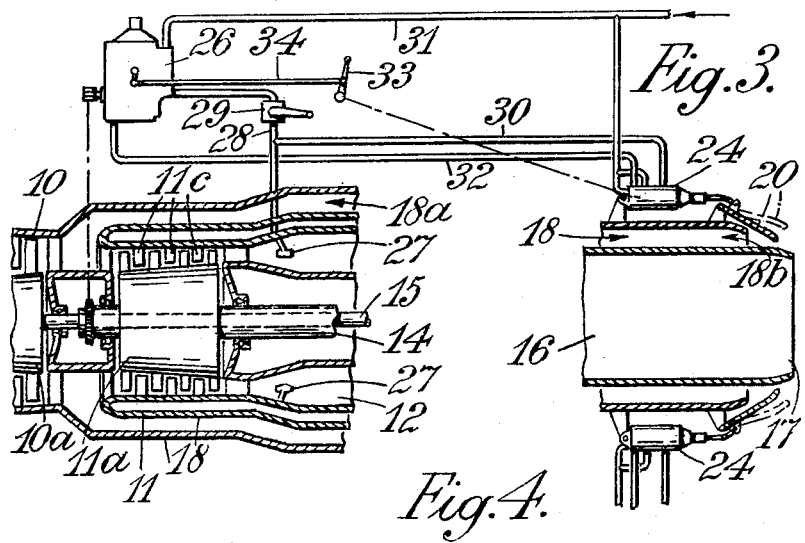
FIGURE 3 is a view corresponding to FIGURE 1 of a second embodiment.

In FIGURE 1, the engine illustrated is a by-pass gas-turbine jet-propulsion engine suitable for aircraft propulsion purposes.

The engine comprises in flow series arrangement a low-pressure compressor 10 having a rotor 10a, a high-pressure compressor 11 having a rotor 11a, combustion equipment 12, and a multi-stage turbine 13 having a high-pressure rotor 13a drivingly connected to rotor 11a by a hollow shaft 14 and a low-pressure rotor 13b drivingly connected to rotor 10a by a shaft 15 extending coaxially through the rotor 13a, 11a and shaft 14. The engine also comprises an exhaust assembly 16 through which the turbine exhaust gases flow rearwardly to a propulsion nozzle 17 opening to atmosphere. The engine also comprises structure 18 defining a by-pass passage 18a receiving a proportion of the air compressed in the low-pressure compressor 10 and conveying the by-pass air to an annular outlet nozzle 18b surrounding the nozzle 17 and leading to atmosphere.

Figure 4:
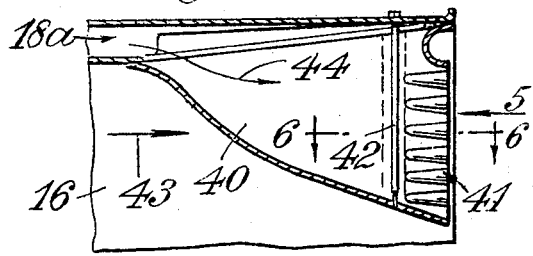
FIGURE 4 is an axial section through part of a jet pipe into which the by-pass air is fed into a turbine exhaust assembly to mix with the exhaust gases and shows means for varying the flow through the by-pass passage.
Figure 5:
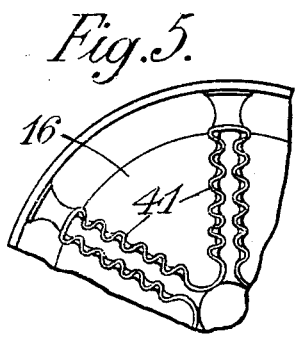
FIGURE 5 is a view in the direction of arrow 5 on FIGURE 4.
Figure 6:
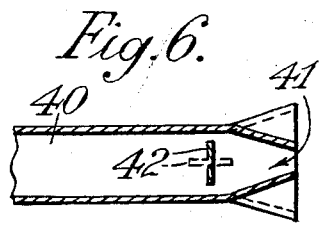
FIGURE 6 is a section on the line 6—6 of FIGURE 4.

Alternatively as shown in FIGURES 4 to 6, the by-pass passage may terminate in nozzles 41 delivering the by-pass air into the exhaust assembly 16 to mix with the exhaust gases from the engine turbine 13.

In accordance with the present invention, the high-pressure compressor 11 is provided with adjustable stator blades 11b. In the construction illustrated there are three rows of stator blades 11b which are adjustable in stagger and which are shown in the drawing as being adjustable simultaneously by means of a ram 25.

By arranging that the stator blades 11b are adjustable in stagger, a number of important effects may be obtained.

One effect which may be obtained, is matching of the total pressure of the by-pass air in the by-pass passage 18a with the total pressure of the hot gases in the exhaust assembly 16. This is a particularly desirable effect in engines in which the by-pass air is fed into the exhaust assembly 16 to mix with the exhaust gases. When this effect is required, it is desirable to employ a low-pressure compressor 10 low compression ratio, e.g. a ratio of 2.5:1 or lower, and a high-pressure compressor 11 having a high-compression ratio e.g. 5:1 or higher, since the ratio of the pressure within the exhaust assembly to atmospheric pressure is usually low compared with the total compression ratio in the engine.

The attached graph (FIGURE 7) shows how the by-pass ratio, and thus the mass flow through the high-pressure compressor and the by-pass duct pressure, may be affected by designing the compressors 10, 11 with varying compression ratios. When matching is required the low pressure compressor 10 preferably has a compression ratio of about 2.2:1 and the high pressure compressor 11 has a ratio of about 6:1, and the stator blades 11b are controlled in accordance with an engine operating parameter such as corrected rotational speed of either of the compressors so as to be given an increasing negative setting from a given setting as the corrected rotational speed increases. In many by-pass engines the ratio of the speeds of the two compressors remains substantially constant over the operating range of the engine and the relationship between the temperatures at the inlets of the compressors 10, 11 is also substantially constant for practical purposes and, therefore, the stator blades 11b are conveniently controlled in accordance with corrected rotational speed of the low-pressure compressor 10.

By providing adjustable stator blades 11b and an adjustable outlet from the by-pass passage, it is also possible to obtain extra thrust above the normal design maximum thrust, for instance for take-off in tropical regions.

For this purpose, there is provided means whereby the outlet area of nozzle 18b may be progressively reduced and simultaneously the mass flow through the high-pressure compressor 11 can be increased progressively from the values of these parameters at the design maximum thrust.

In the engine shown in FIGURE 1, the nozzle 18b is provided with a series of area-adjusting flaps 20 which are normally inoperative, but which can be moved from their inoperative position (dotted lines in FIGURE 1) progressively to a position (full lines) in which the outlet of nozzle 18b is reduced to approximately one third of the design value. By progressively closing the flaps 20 the proportion of air which flows in by-pass passage 18a is progressively reduced and a correspondingly greater proportion of air flows through the high-pressure compressor 11.

In order to accommodate the increased mass flow in the compressor 11, the stator blades 11b are adjusted in stagger to be given an increasingly negative setting with respect to their zero, or design, setting as the flaps 20 are closed. The adjustment is indicated graphically and diagrammatically in FIGURES 2 and 2b. In FIGURE 2b, a stator blade 11b is shown in its zero, or design, setting, that is the position it occupies in normal operation, and when the flaps 20 are being closed, the blade 11b, is given a progressively increasing negative setting, that is its inclination to the axial direction 21 is reduced. In FIGURE 2, in which blade settings are plotted against the area of nozzle 18b, the corresponding adjustment is indicated by line 22.

Another effect which may be obtained is the avoidance of stalling of the high pressure compressor 11 in starting and run-up, the blades 11b being given a decreasing positive setting (see line 23 FIGURE 2) as the rotational speed of compressor 11 increases towards a particular value at which stalling of the high-pressure compressor 11 does not occur, at which speed the blades 11b reach their zero setting. During such adjustment, the flaps 20 are inoperative.

In FIGURE 2a the corrected rotational speed of the high-pressure compressor is plotted against angle of high-pressure compressor stator blades, the lines 22a and 23a corresponding to 22 and 23 of FIGURE 2.

The flaps 20 are shown (FIGURE 1) as being moved by rams 24 and the blades 11b are as stated above moved by rams 25, and the rams 24, 25 are arranged for simultaneous operation when extra thrust is required above the design maximum thrust.

In order to obtain the last two effects mentioned above the rams 24, 25 may, for instance, be constructed and operated as described in British Specification No. 704,936 (Rolls-Royce Limited) corresponding to U.S. Patent No. 2,705,590, there being provided additionally withdrawable stops to prevent the flaps 20 closing the nozzle 18b except when additional thrust is required and to prevent the blades 11b being given a negative setting until extra thrust is required.

The rams may comprise (FIGURE 8) a differential-area piston 50 working in a cylinder 51 against a spring 52, the smaller area side 50a of the piston 50 being connected directly to a pressure fluid source 30 and the larger area side 50b being connected to the source 30 through a restrictor 53 and also having a valve-controlled vent 54.

The valve 55 controlling the vent is loaded by a spring in accordance with the piston position and in opposition to the spring by a load produced by a hydraulic signal acting on diaphragm 57, it being arranged that as the hydraulic load increases the piston 50 moves to increase the load of the spring 56. Thus for each value of the hydraulic load there is a corresponding equilibrium position of the piston 50 and of the part moved by the ram through piston rod 50c. Also retractable stops 58 are provided within the rams 58a to prevent rams 24 moving the flaps to close nozzle 18b and to prevent rams 25 giving the blades 11b a negative setting, despite the existence of the appropriate hydraulic signal load, until the stops are withdrawn by operation of lever 33 for selecting extra thrust. The lever 33 may be connected to the throttle 29 to be operated when the throttle is set to an extra thrust position.

The operating fluid for the rams 24, 25 may be fuel delivered by a pump 26 feeding fuel to injectors 27 in the combustion equipment through pipe 28 containing a throttle 29. In this case, the pressure fluid is conveyed to the rams 24, 25 through pipes 30 and the return fluid is conveyed to the suction side of pump 26 through pipes 31.

Where the pump 26 comprises a hydraulic top-speed governor, as is well known, the hydraulic signal load may be derived from the pressure in the governor via pipes 32, and since this pressure depends on the pump speed and the pump 26 is driven from the high-pressure rotor 11a, 14, 13a, the signal will be representative of the rotational speed of the high-pressure compressor 11.

In FIGURE 8, the pump 26 is of well-known construction and comprises a rotor body 60, a plurality of plungers 61 reciprocable in the body by a swash plate 62, the inclination of which is controlled by a servo-mechanism 63. The top speed governor comprises a diaphragm 64 loaded by a tension spring 65 and pressure within chamber 66, which pressure is caused by forming radial bores 67 in the body 60 so that the body acts as a centrifugal pump pressurizing the chamber 66. The diaphragm 64 controls a vent valve 68 of the servo-mechanism 63 and when the pressure in chamber 66 exceeds a value representing the top-speed of high-pressure compressor, the hydraulic load on diaphragm 64 overcomes spring 65 and the vent valve is opened causing the servo-mechanism to reduce the fuel delivery by the pump 26. In this case the hydraulic signal for controlling the rams 24, 25, 58a is taken by conduit 32 from chamber 66.

The pressure in chamber 66 is dependent upon the rotational speed of the pump 26 which is driven at a speed proportional to the high-pressure compressor rotational speed. A hydraulic signal dependent on the corrected rotational speed of the high-pressure compressor may be derived from the pressure in chamber 66 by providing an adjustable restrictor 32a in the conduit 32, the restrictor 32a being adjustable by means 32b which respond to changes of inlet temperature of the high-pressure compressor.

In operation, during starting, run-up and normal engine operation, the stops 58 of rams 24 are operative to prevent flaps 20 being moved despite the fact that the vent valves 55 of the rams 24 are loaded hydraulically in the sense to tend to cause operation of the rams 24 to close the flaps 20. Also as throttle 29 is adjusted in the sense to increase the power output rams 25 are permitted initially to adjust the blades 11b from a positive setting suitable for starting until, at a value of rotational speed of the high-pressure compressor at which the zero setting of the blades is appropriate, the pistons of rams 25 come adjacent their stops 58. For high power settings of the throttle 29, despite the vent valves 55 of the rams 25 being subjected to a hydraulic load in the sense to cause further adjustment of the blades 11b to a negative setting, the stops 58 of the rams 25 prevent such movement.

When extra thrust is required, the lever 33 is operated to permit pressure fluid to enter the rams 58a and withdraw the stops 58 of the rams 24, 25, and, since the throttle 29 will be set for maximum power and the vent valves 55 of the rams 24, 25 will be subjected to a corresponding hydraulic load, the rams 24, 25 will operate simultaneously to adjust flaps 20 progressively to their closed position and to adjust the blades 11b to a negative setting.

Another arrangement for obtaining extra thrust above the design maximum thrust is shown in FIGURE 3 in which the parts identical with those of FIGURE 1 are indicated by like references. In this arrangement, instead of accommodating the increased mass flow through the high-pressure compressor 11 by adjusting the stator blades 11a, it is arranged that the rotational speed of the compressor is increased by increasing the value of rotational speed at which the top speed governor is set to act and by increasing the fuel supply to the combustion equipment 12. This arrangement is employed only when the increased stresses in the engine due to the increase of speed can be accepted by the engine structure without danger of failure.

In this arrangement, on adjustment of the lever 33 to select extra thrust, the stops 58 in rams 24 are withdrawn and simultaneously the top-speed governor is adjusted through link 34, and the throttle 29 is adjusted to increase the fuel supply. As the compressor 11 speeds up so the flaps 20 are gradually closed to reduce the flow of air through the by-pass passage.

FIGURE 9 illustrates one way in which the top-speed governor of a pump such as is shown in FIGURE 8 can be adjusted to permit an increase in the governed top speed. In this arrangement the link 34 is connected to a lever 70 to rock it and the lever 70 according to the direction in which it is rocked raises or lowers an adjustable anchorage 71 for the governor spring 65. When it is desired to increase the speed at which the high-pressure compressor is governed the lever 70 is rocked to increase the tension in spring 65.

Instead of opening directly to atmosphere, as shown in FIGURES 1 and 3, the by-pass passage 18a may open as shown in FIGURES 4 to 6 into the exhaust assembly 16, and in such case the following arrangement may be employed for varying the proportion of air flowing in the by-pass passage when extra thrust is required.

The outlet from by-pass passage 18a is formed by a series of flattened nozzles 40 terminating in openings 41 with corrugated peripheries, for example as set forth in U.S. patent application Serial No. 725,326, (Rolls-Royce Limited), and each nozzle is provided with a pivoted valve element 42, which is adjustable between an inoperative position (dotted lines—FIGURES 4 and 6) in which the valve element 42 permits air to flow unobstructedly from the nozzle, and a fully-operative position (full lines) in which flow through the nozzle is substantially prevented. In FIGURE 4 the arrow 44 represents by-pass air and the arrow 43 represents returning turbine exhaust gas. The valve elements 42 may be moved by rams, such as rams 24, and may be coupled together for simultaneous operation.

It is only necessary for the adjustable flaps 20 or the valve elements 42 to restrict the by-pass passage outlet area to approximately one third of the full design area.

In the arrangement shown in FIGURE 10 the ram 25 has its piston rod 50c connected to radius arms 80 secured to spindles 81 journalled in a stator casing and carrying one of the adjustable stator blades 11b. At its opposite end the stator blade 11b has a radius arm 82 engaging a notch in a ring 83 rotatable within the stator structure and all the remaining blades of the ring of blades have similar radius arms engaging corresponding notches. Thus, when the stator blade 11b carried by the spindle 81 is rotated to adjust its stagger, the ring 83 is rotated through the radius arm 82 and corresponding adjustments of the remaining blades 11b in the row are effected.

We claim:
1. A by-pass gas turbine engine comprising a low-pressure air compressor, a high-pressure air compressor, said high-pressure compressor and said low-pressure compressor being independently rotatable, and a by-pass passage, said low-pressure compressor being connected to deliver a proportion of the air compressed therein to said high-pressure compressor and a further proportion of said air to said by-pass passage, first means controlling the air flow in said by-pass passage and operative progressively to decrease the proportion of air flowing in the by-pass passage, and second means operable simultaneously with said first means and operative to increase the mass flow of air through the high-pressure compressor as the proportion of air flowing in the by-pass passage is decreased, and control means connected to actuate said first means to decrease the proportion of air flowing in the by-pass passage and simultaneously to actuate the second means to increase the mass flow of air through the high-pressure compressor.

2. A gas-turbine engine according to claim 1, said second means including a top-speed governor connected to prevent the rotational speed of the high-pressure compressor exceeding a design top speed, and means connected to adjust the top-speed governor to allow the rotational speed of the high-pressure compressor to exceed the design top-speed.

3. A gas-turbine engine according to claim 1, wherein the high-pressure compressor comprises at least one row of stator blades which are supported to be adjustable in stagger from a zero position and the second means is connected to control adjustment of the stator blades negatively from their zero position of stagger.

4. A gas-turbine engine according to claim 3, wherein said second means is also connected to adjust the stator blades positively to and from their zero position of stagger.

5. A gas-turbine engine according to claim 1, wherein said by-pass passage has an annular outlet and the first means comprises adjustable flaps at the annular outlet from the passage.

6. A gas-turbine engine according to claim 5 wherein the adjustable flaps when fully operative decrease the by-pass passage outlet area to approximately one-third of the full design area.

7. A gas-turbine engine according to claim 5, wherein the adjustable valve elements when fully operative decrease the by-pass passage outlet area to approximately one third of the full design area.

8. A gas-turbine engine according to claim 1 comprising also combustion equipment, turbine means, and a turbine exhaust system connected in flow series arrangement downstream of the high-pressure compressor, and the by-pass passage having nozzles at it outlet end delivering the by-pass air into the turbine exhaust system, the first means proportion of air flowing in the by-pass passage comprising adjustable valve elements in the nozzles.

9. A gas-turbine engine comprising a low-pressure air compressor, a high-pressure air compressor, and a by-pass air passage, said low-pressure compressor being connected to deliver a proportion of the air compressed therein to said high-pressure compressor and a further proportion of said air to the by-pass passage, said by-pass passage having an outlet, adjustable members co-operating with the outlet of the by-pass passage to vary its outlet area and thereby to control the proportion of air flowing in the by-pass passage, a first ram connected to adjust the adjustable members, stator blades in the high-pressure compressor mounted to be adjustable in stagger negatively from a zero stagger position, a second ram connected to adjust the stator blades, a pressure fluid source, and pump means driven by the high-pressure compressor producing a hydraulic pressure signal dependent on the speed of the high-pressure compressor, each of said rams comprising a cylinder, a spring and a differential area piston working in the cylinder against the spring, said pressure fluid source being connected directly to the cylinder on the smaller area side of the piston and through a restrictor to the cylinder on the larger area side of the piston, a vent from the cylinder on the larger area side of the piston, a valve controlling the vent, an auxiliary spring between the valve and the piston and loading the valve in accordance with the piston position, and means applying said hydraulic signal to the valve in opposition to the auxiliary spring, said first ram also comprising a retractable stop preventing movement of the piston to adjust the adjustable members to reduce the outlet area of the by-pass passage, and said second ram including a retractable stop preventing movement of the piston to adjust the stator blades negatively from the zero position, and a selector connected to withdraw stops when extra thrust is required.

10. A gas-turbine engine comprising a low-pressure air compressor, a high-pressure air compressor, and a by-pass air passage, said low-pressure compressor being connected to deliver a proportion of the air compressed therein to said high-pressure compressor and a further proportion of said air to the by-pass passage, said by-pass passage having an outlet, adjustable members co-operating with the outlet of the by-pass passage to vary its outlet area and thereby to control the proportion of air flowing in the by-pass passage, a ram connected to actuate the adjustable members, a pressure fluid source, top-speed governor means driven by and operating to prevent the rotational speed of the high-pressure compressor exceeding a selected value, said top-speed governor means including pump means producing an hydraulic signal representing the rotational speed of the high-pressure compressor, said top-speed governor including means adjustable to vary the selected value of speed at which it acts, and a fuel supply for the engine including a fuel throttle, said ram comprising a cylinder, a spring and a differential area piston working in the cylinder and against the spring, said cylinder being connected on the smaller area side of the piston directly to the pressure fluid source said cylinder being connected on the larger area side of the piston the source through a restrictor, a vent from the cylinder on the larger side of the piston, a valve controlling the vent, an auxiliary spring interposed between the piston and the vent valve and loading the vent valve in accordance with the position of the piston, said vent valve being loaded by said hydraulic signal in opposition to the auxiliary spring, a retractable stop preventing movement of the piston to adjust the adjustable members to reduce the area of the outlet of the by-pass passage, and means, connected to retract the stop and simultaneously to actuate said adjustable means of the top-speed governor to increase the selected value of speed of the high-pressure compressor.

11. A gas turbine engine comprising a low-pressure compressor having a rotor, a high-pressure compressor having a rotor rotatable independently of the rotor of the low-pressure compressor, combustion equipment, a high-pressure turbine, and a low-pressure turbine connected in flow series arrangement, the high-pressure turbine driving the rotor of the high-pressure compressor and the low-pressure turbine driving the rotor of the low-pressure compressor, an exhaust assembly connected to receive exhaust gases from the turbines, a by-pass passage connected at one end to receive a proportion of the air compressed in the low-pressure compressor to convey it rearwardly without passing through the high-pressure compressor, the combustion equipment and the turbines, said high-pressure compressor including axially-spaced rows of stator blades, at least one of said rows of stator blades being adjustable in stagger, the air flowing in the by-pass passage having a first total pressure and the exhaust gases flowing in the exhaust assembly having a second total pressure, and means connected to adjust the adjustable stator blades to effect matching of the total pressures within the by-pass passage and the exhaust assembly of the engine.

12. A by-pass gas-turbine engine according to claim 11, said means being responsive to an engine operating parameter indicative of the corrected rotational speed of either compressor and being operative to adjust the blades negatively from a design setting as the corrected rotational speed increases.

13. A by-pass gas-turbine engine according to claim 12, wherein the low-pressure compressor is selected to have a low compression ratio and the high-pressure compressor is selected to have a high compression ratio.

14. A by-pass gas-turbine engine according to claim 13, wherein the low-pressure compressor has a compression ratio of about 2.2:1 and the high-pressure compressor has a compression ratio of about 6:1.

References Cited in the file of this patent

UNITED STATES PATENTS

| | | |
|---|---|---|
| 2,588,532 | Johnson | Mar. 11, 1952 |
| 2,718,349 | Wilde | Sept. 20, 1955 |
| 2,741,423 | Lombard | Apr. 10, 1956 |
| 2,785,848 | Lombard | Mar. 19, 1957 |
| 2,844,936 | Fowler et al. | July 29, 1958 |
| 2,873,576 | Lombard | Feb. 17, 1959 |
| 2,886,968 | Johnson | May 19, 1959 |

FOREIGN PATENTS

| | | |
|---|---|---|
| 595,357 | Great Britain | Dec. 3, 1947 |
| 704,669 | Great Britain | Feb. 24, 1954 |
| 750,408 | Great Britain | June 13, 1956 |
| 243,957 | Switzerland | Feb. 17, 1947 |